(12) United States Patent
Tan et al.

(10) Patent No.: US 11,312,019 B2
(45) Date of Patent: Apr. 26, 2022

(54) METHOD FOR WORK PIECE CALIBRATION AND ROBOT SYSTEM USING THE SAME

(71) Applicant: ABB Schweiz AG, Baden (CH)

(72) Inventors: Jiajing Tan, Shanghai (CN); Hao Gu, Shanghai (CN); Jinsong Li, Beijing (CN); Yan Xu, Shanghai (CN); Shaojie Cheng, Shanghai (CN); Lei Mao, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 218 days.

(21) Appl. No.: 16/377,869

(22) Filed: Apr. 8, 2019

(65) Prior Publication Data

US 2019/0232499 A1 Aug. 1, 2019

Related U.S. Application Data

(63) Continuation of application No. PCT/CN2016/105054, filed on Nov. 8, 2016.

(51) Int. Cl.
  *B25J 9/16* (2006.01)
  *G05B 19/404* (2006.01)
  *G01B 21/04* (2006.01)

(52) U.S. Cl.
  CPC ........... *B25J 9/1692* (2013.01); *B25J 9/1617* (2013.01); *B25J 9/1664* (2013.01); *G01B 21/042* (2013.01);
  (Continued)

(58) Field of Classification Search
  CPC ...... B25J 9/1692; B25J 9/1617; B25J 9/1664; G05B 19/404; G05B 2219/39021; G05B 2219/39032; G01B 21/042
  See application file for complete search history.

(56) References Cited

U.S. PATENT DOCUMENTS 4,841,762 A 6/1989 Hunter
5,586,387 A * 12/1996 Nakatani ................. B23P 21/00
                                            29/703

(Continued)

FOREIGN PATENT DOCUMENTS

CN 101097131 A 1/2008
CN 101097132 A 1/2008

(Continued)

OTHER PUBLICATIONS

State Intellectual Property Office of the P.R. China, International Search Report & Written Opinion issued in corresponding Application No. PCT/CN2016/105054, dated Aug. 3, 2017, 10 pp.

(Continued)

*Primary Examiner* — Jason Holloway
(74) *Attorney, Agent, or Firm* — Greenberg Traurig, LLP

(57) ABSTRACT

A method for calibration of work piece mounted in a predetermined manner to a work object and a robot system using the same. The work object has a first surface, a second surface and a third surface, and wherein the work object frame of reference is defined by a first coordinate line, a second coordinate line, and a third coordinate line at intersections of the first surface, the second surface and the third surface converging on a point. The method includes: touching a first number of locations on the first surface of the work object positioned by the robot touch probe to measure their actual locations on the first surface in the robot frame of reference, and storing the measured first coordinates for the measured locations; touching a second number of locations on the second surface of the work object positioned by the robot touch probe to measure their actual locations on the second surface in the robot frame of reference, and storing the measured second coordinates for the measured locations; touching a third number of locations on the third surface of the work object positioned by the robot touch probe to (Continued)

measure their actual locations on the third surface in the robot frame of reference, and storing the measured third coordinates for the measured locations; calculating orientation and origin of the work object frame of reference from the robot frame of reference based on the measured first, second and third coordinates for the measured locations, where the work object is positioned in the robot cell. The method provides all the necessary data to determine orientation and origin of the actual work object frame of reference relative to the robot frame of reference. The method also enables the robot to perform machine operations accurately at locations on a work object.

16 Claims, 2 Drawing Sheets

(52) U.S. Cl.
CPC .. *G05B 19/404* (2013.01); *G05B 2219/39021* (2013.01)

(56) References Cited

U.S. PATENT DOCUMENTS

| | | | | |
|---|---|---|---|---|
| 5,929,584 | A * | 7/1999 | Gunnarsson | B25J 9/1692 |
| | | | | 318/568.16 |
| 6,070,109 | A * | 5/2000 | McGee | B25J 9/1692 |
| | | | | 700/254 |
| 6,668,466 | B1 * | 12/2003 | Bieg | G01B 5/008 |
| | | | | 33/1 PT |
| 6,772,493 | B2 * | 8/2004 | Yamanashi | B23Q 1/66 |
| | | | | 269/309 |
| 8,871,043 | B2 * | 10/2014 | Okuda | B32B 38/1833 |
| | | | | 156/64 |
| 2002/0148275 | A1 * | 10/2002 | Abbe | G01B 21/042 |
| | | | | 73/1.01 |
| 2006/0247817 | A1 | 11/2006 | Otsuki | |
| 2009/0234502 | A1 | 9/2009 | Ueyama et al. | |
| 2010/0272348 | A1 * | 10/2010 | Pulla | G01B 9/02029 |
| | | | | 382/154 |
| 2013/0118689 | A1 * | 5/2013 | Okuda | B05D 1/32 |
| | | | | 156/378 |
| 2015/0258688 | A1 | 9/2015 | Suzumura et al. | |
| 2016/0016317 | A1 * | 1/2016 | Trompeter | B25J 9/1692 |
| | | | | 700/254 |

FOREIGN PATENT DOCUMENTS

| | | |
|---|---|---|
| CN | 103322953 A | 9/2013 |
| EP | 2660014 A1 | 11/2013 |
| EP | 2818283 A1 | 12/2014 |
| JP | 2010149267 A | 7/2010 |
| JP | 2011152599 A | 8/2011 |
| JP | 2011230243 A | 11/2011 |
| WO | 2010060459 A1 | 6/2010 |

OTHER PUBLICATIONS

European Patent Office, Extended European Search Report issued in corresponding European application No. 16921097.8, dated Jul. 3, 2020, 11 pp.
Indian Patent Office, Examination Report issued in corresponding Application No. 201947013377, dated Mar. 23, 2021, 5 pp.
Indonesian Patent Office, Office Action issued in corresponding Application No. P00201901711, dated Apr. 6, 2021, 4 pp.
Office Action dated Jul. 7, 2021 for corresponding China Application No. 2016800897832.
Search Report dated Jul. 7, 2021 for corresponding China Application No. 2016800897832.

* cited by examiner

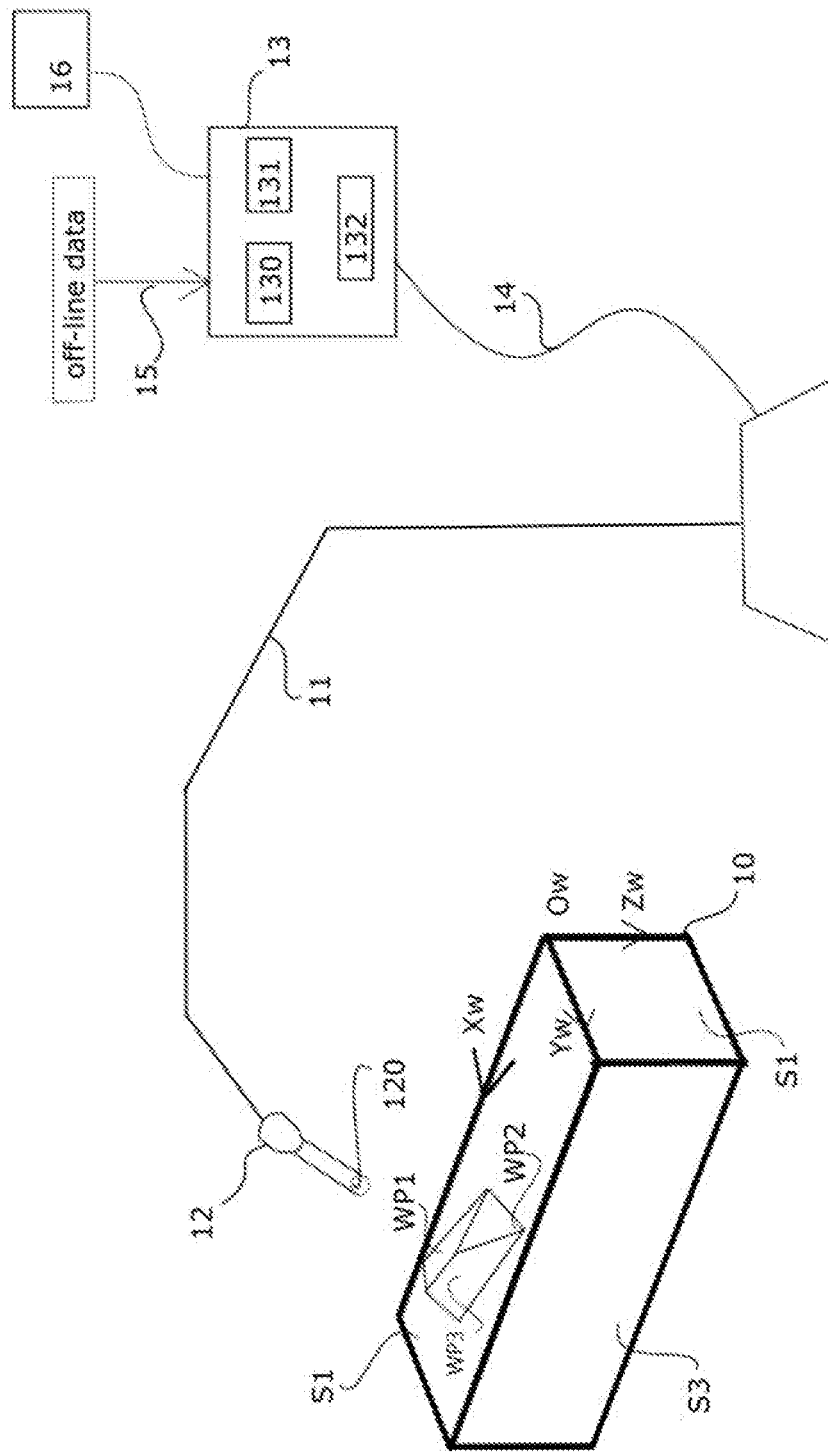

METHOD FOR WORK PIECE CALIBRATION AND ROBOT SYSTEM USING THE SAME

TECHNICAL FIELD

The invention relates to control for robot, and more particularly to control for robot by means of touching device.

BACKGROUND ART

A robot is a reprogrammable, multifunctional manipulator designed to move tools or specialized devices through variable, programmed motions for the performance of a variety of tasks, such as machining work pieces. A robot has a robot controller and a manipulator with several axes of motion under the control of the robot controller. Maintaining an identifiable relationship between the robot and the work object is necessary. This is especially true where there is a relative movement between the robot and work piece causing the work piece assumes a new location with respect to the robot. Therefore, it is desirable to implement a scheme whereby the positional relationship between the robot and the work object is easily identifiable each time the work piece is placed at a new location with respect to the robot.

Patent EP 2,828,283 A1 discloses a method for calibration of robot in relation to robot installation, involves storing manual movement in form of addition to nominal model and addition includes corrections of nominal coordinates. The method involves modeling a robot installation in a nominal model and has a description of a work object and a parameter set describing physical relationships in robot. The desired positions are defined as coordinates in model. The coordinates are converted to robot coordinates. The robot is operated to reach a series of robot positions defined by robot coordinates. The robot is manually moved from robot positions to a corresponding desired position. The manual movement is stored in form of an addition to nominal model and addition includes corrections of nominal coordinates.

A disadvantage of the solution according to the patent is a high degree of operator interaction which can be extremely time consuming and inaccurate.

BRIEF SUMMARY OF THE INVENTION

According to one aspect of present invention, it provides a method for calibration of work piece mounted in a predetermined manner to a work object in a robot system, wherein the work object has a first surface, a second surface and a third surface, and wherein the work object frame of reference is defined by a first coordinate line, a second coordinate line, and a third coordinate line at intersections of the first surface, the second surface and the third surface converging on a point, including: touching a first number of locations on the first surface of the work object positioned by the robot touch probe to measure their actual locations on the first surface in the robot frame of reference, and storing the measured first coordinates for the measured locations; touching a second number of locations on the second surface of the work object positioned by the robot touch probe to measure their actual locations on the second surface in the robot frame of reference, and storing the measured second coordinates for the measured locations; touching a third number of locations on the third surface of the work object positioned by the robot touch probe to measure their actual locations on the third surface in the robot frame of reference, and storing the measured third coordinates for the measured locations; calculating orientation and origin of the work object frame of reference from the robot frame of reference based on the measured first, second and third coordinates for the measured locations, where the work object is positioned in the robot cell.

According to another aspect of present invention, it provides a robot system, including: a work object, having a first surface, a second surface and a third surface, wherein the work object frame of reference is defined by a first coordinate line, a second coordinate line, and a third coordinate line at intersections of the first surface, the second surface and the third surface converging on a point, and being configured for having a work piece mounted thereto in a predetermined manner; a manipulator holding a touch probe; and a robot controller having a motion control module, a calculation module and a memory module; wherein: where the motion control module is adapted for controlling the manipulator to touch a first number of locations on the first surface of the work object positioned by the robot touch probe to measure their actual locations on the first surface in the robot frame of reference, touch a second number of locations on the second surface of the work object positioned by the robot touch probe to measure their actual locations on the second surface in the robot frame of reference, and touch a third number of locations on the third surface of the work object positioned by the robot touch probe to measure their actual locations on the third surface in the robot frame of reference; the memory module is adapted for storing the measured first coordinates for the measured locations, storing the measured second coordinates for the measured locations, and storing the measured third coordinates for the measured locations; and the calculation module is adapted for calculating orientation and origin of the work object frame of reference from the robot frame of reference based on the measured first, second and third coordinates for the measured locations, where the work object is positioned in the robot cell.

The technical solutions according to present invention may provide all the necessary data to determine a orientation and origin of the actual work object frame of reference relative to the robot frame of reference. This enables the robot to perform machine operations accurately at locations on a work object.

Preferably, orientation of the work object frame of reference relative to the robot frame of reference is determined based on orientations of the first coordinate line, the second coordinate line and the third coordinate line which are calculated by applying algorithm of square fitting respectively to the measured first, second and third coordinates for the measured locations; and the origins between of the work object frame of reference and the robot frame of reference is determined based on coordinate in the robot frame of reference for the converging point of the first, second and third coordinate line which is calculated by applying algorithm of square fitting respectively to the measured first, second and third coordinates for the measured locations.

Preferably, orientations of the second and third coordination lines of the fixture frame of reference are regulated to be normal to that of the first coordination line of the fixture frame of reference in the robot frame of reference.

Preferably, the first, second and third surface are arranged substantially perpendicular to each other.

The goal of course is to perform the minimum amount of steps while achieving the highest degree of accuracy. In order to have definite outcome from the square fitting, the first number amounts equal to or above three, the second number amounts equal to or above three, and the third number amounts equal to or above three. The invention provides for quick and accurate determination of the orientation and location of a work object relative to a robot. The lack of a requirement to locate precisely defined points on the fixture facilitates the overall process.

BRIEF DESCRIPTION OF THE DRAWINGS

The subject matter of the invention will be explained in more detail in the following text with reference to preferred exemplary embodiments which are illustrated in the drawings, in which:

FIG. 2 illustrates the work object and a work piece in a shape without touchable geometry features.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
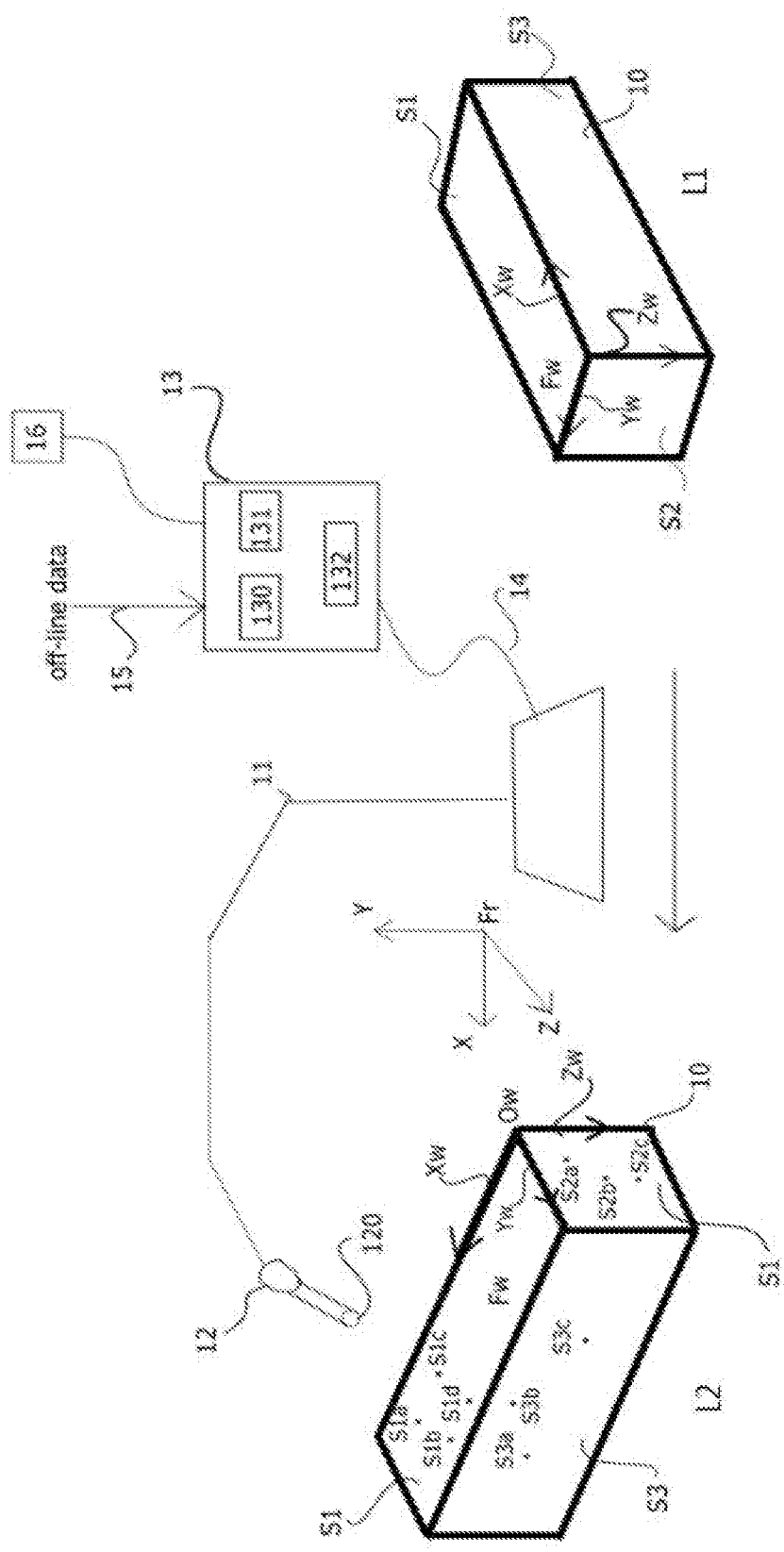
FIG. 1 illustrates a robot system according to an embodiment of present invention.

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods and programming procedures, devices, and circuits are omitted so not to obscure the description of the present invention with unnecessary detail.

FIG. 1 illustrates a robot system according to an embodiment of present invention. As shown in FIG. 1, the robot system 1 includes a work object 10, a manipulator 11, a touch probe 12 and a robot controller 13.

The work object 10, for example, may be shaped like a block, a cube, and rectangular parallelepiped, having a first surface S1, a second surface S2 and a third surface S1. The work object frame of reference Fw is defined by a first coordinate line Xw, a second coordinate line Yw, and a third coordinate line Zw at intersections of the first surface S1, the second surface S2 and the third surface S3 converging on a point Ow. The work object 10 in shape of a block is described as an example hereafter, wherein the first surface S1, the second surface S2 and the third surface S3 are the three orthogonal planes.

The manipulator 11 may be controlled by the robot controller 13 holding the touch probe 12 or terminating in the touch probe 12. The probe 12, which may be a linear touch sensor, is operable to provide a signal to the robot controller 13 whenever its pointer 120 comes into contact with an object, i.e. is displaced.

The robot controller 13 controlling the functions of the robot system 1 may have a motion control module 130, a calculation module 131 and a memory module 132. The robot controller 13 is provided with a data link 14 for receiving commands to control the position of the manipulator 11 and of tools and sensors affixed thereto. A computer 16 provides operator interface for editing the data stored in the memory module 132 of the robot controller 13.

For example, where the work object 10 was transferred to a second location L2 from the first location L1 in the robot cell within the manipulator's working range, since the location of the work object 10 with respect to the robot frame of reference Fr has been changed, the positional relationship between the robot and the work object needs to be updated for the performance of a variety of tasks, such as machining work pieces. In practice, greater accuracy and operation efficiency may be required. Therefore, it is essential to determine the actual location and orientation of the work object relative to the robot. This is accomplished, generally, by identifying the work object frame of reference in coordinates of the robot frame of reference.

To identify the work object frame of reference in coordinates of the robot frame of reference at the second location L2, the motion control module 130 of the robot controller 13 may control the manipulator 11 in response to the command from the computer 16 to cause the touch probe 12 to touch the first surface S1 of the work object 10 at a first number of locations S1$a$, S1$b$, S1$c$, S1$d$, the actual locations of the first number of locations S1$a$, S1$b$, S1$c$, S1$d$ are measured by the touch probe 12, and accordingly the measured first coordinates in the robot frame of reference Fr is provided to the robot controller 13 and stored in its memory module 132. The motion control module 130 of the robot controller 13 may control the manipulator 11 in response to the command from the computer 16 to cause the touch probe 12 to touch the second surface S2 of the work object 10 at a second number of locations S2$a$, S2$b$, S2$c$, the actual locations of the second number of locations S2$a$, S2$b$, S2$c$ are measured by the touch probe 12, and accordingly the measured second coordinates in the robot frame of reference Fr is provided to the robot controller 13 and stored in its memory module 132. The touching locations on the surface of the work object may be random selected, in case that at least three of them are not collinear. In addition, the motion control module 130 of the robot controller 13 may control the manipulator 11 in response to the command from the computer 16 to cause the touch probe 12 to touch the third surface S3 of the work object 10 at a third number of locations S3$a$, S3$b$, S3$c$, the actual locations of the third number of locations S3$a$, S3$b$, S3$c$ are measured by the touch probe 12, and accordingly the measured third coordinates in the robot frame of reference Fr is provided to the robot controller 13 and stored in its memory module 132. In actual operation, the touch probe 12 may be moved quickly, in gross increments, to contact the work object surface, and then backed off with high resolution increments—the position measurement being taken when the touch probe 13 loses contact with the work object surface—hence, the concept of "touching off."

Using the measured coordinates for first number of locations S1$a$, S1$b$, S1$c$, S1$d$ (four locations, for example), the second number of locations S2$a$, S2$b$, S2$c$ (three locations, for example) and the third number of locations S3$a$, S3$b$, S3$c$ (three locations, for example), the first surface S1, the second surface S2 and the third surface S3, the second surface S2 and the third surface S3 of the work object 13 may be modeled via mathematical algorithm, for example, equations (1) and (2), and thus the coordinates in the robot frame of reference Fr for the origin of the work object frame of reference Fw may be calculated.

$$\begin{cases} a_{s1}X + b_{s1}Y + c_{s1}Z = 1 \\ a_{s2}X + b_{s2}Y + c_{s2}Z = 1 \\ a_{s3}X + b_{s3}Y + c_{s3}Z = 1 \end{cases} \quad (1)$$

Where (X, Y, Z) indicate the coordinates in the robot frame of reference for the origin of the work object frame of reference, $a_{s1}$, $b_{s1}$, and $c_{s1}$ are three factors to describe the first surface S1, $a_{s2}$, $b_{s2}$, and $c_{s2}$ are three factors to describe the second surface S2, $a_{s3}$, $b_{s3}$, and $c_{s3}$ are three factors to describe the third surface S3, in 3D in Algebra.

The 3D least fitting algorithm to solve the $a_{s1}, b_{s1}, c_{s1}$ factors is:

$$\begin{bmatrix} X_{1,si} & Y_{1,si} & Z_{1,si} \\ X_{2,si} & Y_{2,si} & Z_{2,si} \\ X_{3,si} & Y_{3,si} & Z_{3,si} \\ \vdots & \vdots & \vdots \\ X_{n,si} & Y_{n,si} & Z_{n,si} \end{bmatrix} \cdot \begin{bmatrix} a_{si} \\ b_{si} \\ c_{si} \end{bmatrix} = \begin{bmatrix} -1 \\ -1 \\ -1 \\ \vdots \\ -1 \end{bmatrix} \quad (2)$$

Where $X_{n,si}$, $Y_{n,si}$, $Z_{n,si}$ are the measured coordinates for the nth measured location on the ith surfaces of the work object.

For example:

$(X_{1,s1}, Y_{1,s1}, Z_{1,s1})$ indicate the measured coordinates in the robot frame of reference Rf for the first measured location S1a on the first surface S1;

$(X_{2,s1}, Y_{2,s1}, Z_{2,s1})$ indicate the measured coordinates in the robot frame of reference Rf for the second measured location S1b on the first surface S1;

$(X_{3,s1}, Y_{3,s1}, Z_{3,s1})$ indicate the measured coordinates in the robot frame of reference Rf for the third measured location S1c on the first surface S1;

$(X_{4,s1}, Y_{4,s1}, Z_{4,s1})$ indicate the measured coordinates in the robot frame of reference Rf for the fourth measured location S1d on the first surface S1;

$(X_{1,s2}, Y_{1,s2}, Z_{1,s2})$ indicate the measured coordinates in the robot frame of reference Rf for the first measured location S2a on the second surface S2;

$(X_{2,s2}, Y_{2,s2}, Z_{2,s2})$ indicate the measured coordinates in the robot frame of reference Rf for the second measured location S2b on the second surface S2;

$(X_{3,s2}, Y_{3,s2}, Z_{3,s2})$ indicate the measured coordinates in the robot frame of reference Rf for the third measured location S2c on the second surface S2;

$(X_{1,s3}, Y_{1,s3}, Z_{1,s3})$ indicate the measured coordinates in the robot frame of reference Rf for the first measured location S3a on the third surface S3;

$(X_{2,s3}, Y_{2,s3}, Z_{2,s3})$ indicate the measured coordinates in the robot frame of reference Rf for the second measured location S3b on the third surface S3;

$(X_{3,s3}, Y_{3,s3}, Z_{3,s3})$ indicate the measured coordinates in the robot frame of reference Rf for the third measured location S3c on the third surface S3.

In summary, the origins between of the work object frame of reference Fw and the robot frame of reference Fr may be determined based on coordinate in the robot frame of reference for the converging point of the first, second and third coordinate line which is calculated by applying algorithm of square fitting respectively to the measured first, second and third coordinates for the measured locations.

Orientation of the work object frame of reference Fw relative to the robot frame of reference Fr may be determined based on orientations of the first coordination line Xw, the second coordination line Yw, and the third coordination line Zw which may calculated by applying algorithm of square fitting respectively to the measured first, second and third coordinates for the measured locations.

Three vectors may be created from the calculation results. In particular, vectors $(a_{s1}\ b_{s1}\ c_{s1})$, $(a_{s2}\ b_{s2}\ c_{s2})$ $(a_{s2}\ b_{s2}\ c_{s2})$ representing the orientation of the work object frame of reference Fw are stored in the memory module 132 of the robot controller 13.

This provides all the necessary data to determine a orientation and origin of the actual work object frame of reference relative to the robot frame of reference. This enables the robot to perform machine operations accurately at locations on a work object.

Under the embodiment according to present invention, the robot system is able to determine the orientation and origin of the robot frame of reference by touching four locations on the first surface of the work object, three locations on the second surface of the work object, and three locations on the third surface of the work object. The goal of course is to perform the minimum amount of steps while achieving the highest degree of accuracy. In order to have definite outcome from the square fitting, the first number amounts equal to or above three, the second number amounts equal to or above three, and the third number amounts equal to or above three. The invention provides for quick and accurate determination of the orientation and location of a work object relative to a robot. The lack of a requirement to locate precisely defined points on the fixture facilitates the overall process.

The orientations of the second and third coordination lines of the fixture frame of reference may be regulated to be normal to that of the first coordination line of the fixture frame of reference in the robot frame of reference. This procedure is disclosed in "An automatic industrial robot cell calibration method", Jingguo Ge & Hao Gu, *Conference ISR ROBOTIK* (p. 389), 2014, Berlin.

Based on the embodiment according to the present invention, a positional relationship between the robot and a workpiece may be determined, in particular considering that the work piece has a shape without touchable geometry features, such as those with irregular shape or bumpy surface; thus, by touching three points, it is not possible to form this plane in terms of AX+BY+CZ=1. FIG. 2 illustrates the work object and a work piece in a shape without touchable geometry features. As shown in FIG. 2, the work object 10 may be configured for having a work piece WP mounted thereto in a predetermined manner. For example, the work piece WP may be oriented and fastened to the work object 10 on its first surface S1. Therefore, the work piece WP and the fixture 10 may be transferred together with each other without relative movement therebetween.

Similar to the embodiment according to FIG. 1, the manipulator 11 may be controlled by the robot controller 13 holding the touch probe 12 or terminating in the touch probe 12, and the orientation and the origin of the work object frame of reference with respect to the robot frame of reference may be determined accordingly.

Positioning the work object and associated workpiece fairly accurately relative to a robot is a well-established procedure. Therefore, both work object and work piece orientation and location are fairly accurately in robot coordinates known. In order to define the coordinates of the points on the work piece WP in the robot frame of reference Fr, off-line data 15, such as from a CAD data base, are provided to and stored in the memory module 132 of the robot controller 13 and specifies coordinates in the work object frame of reference Fw for a multiple of points WP1, WP2, WP3 on the work piece WP. In consideration of the orientation and origin in the robot frame of reference for the work object frame of reference and the coordinates of the points on the work piece WP in the robot frame of reference, the coordinates in the robot frame of reference for the multiple of points WP1, WP2, WP3 on the work piece may be determined.

In the scenario where the work piece may not be with qualified geometry and it is difficult to directly identify its actual location by directly touching the work piece by the manipulator, it is essential to determine the actual location and orientation of the work piece object relative to the robot frame of reference in the first place. This is accomplished, generally, by identifying the work object frame of reference in coordinates of the robot frame of reference as described above. Then, a coordinate transformation indicative of the position and orientation of the work piece in the work object frame of reference is determined and subsequently applied to off-line data (workpiece coordinates in the work object frame of reference) specifying the location and orientation of the workpiece located thereon.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for calibration of a work piece mounted in a predetermined manner to a work object in a robot system, wherein the work object has a first surface, a second surface and a third surface, and wherein the work object frame of reference is defined by a first coordinate line, a second coordinate line, and a third coordinate line at intersections of the first surface, the second surface and the third surface converging on a point, the method comprising:
   touching a first number of locations on the first surface of the work object positioned by the robot touch probe to measure their actual locations on the first surface in the robot frame of reference, and storing the measured first coordinates for the measured locations;
   touching a second number of locations on the second surface of the work object positioned by the robot touch probe to measure their actual locations on the second surface in the robot frame of reference, and storing the measured second coordinates for the measured locations;
   touching a third number of locations on the third surface of the work object positioned by the robot touch probe to measure their actual locations on the third surface in the robot frame of reference, and storing the measured third coordinates for the measured locations;
   calculating orientation and origin of the work object frame of reference from the robot frame of reference based on the measured first, second and third coordinates for the measured locations, where the work object is positioned in the robot cell;
wherein:
   the first number amounts equal to or above three;
   the second number amounts equal to or above three; and
   the third number amounts equal to or above three; and
   determining coordinates in the robot frame of reference for multiple points on the work piece, based on off-line data specifying coordinates in the work object frame of reference for the multiple points on the work piece and in consideration of the calculated orientation and origin of the work object frame of reference; and
   applying to the work piece a coordinate transformation indicative of the off-line data specifying the workpiece coordinates in the work object frame of reference.

2. The method according to claim 1, wherein:
determining orientation of the work object frame of reference relative to the robot frame of reference based on orientations of the first coordinate line, the second coordinate and the third coordinate line which are calculated by applying algorithm of square fitting respectively to the measured first, second and third coordinates for the measured locations; and
determining the origins between of the work object frame of reference and the robot frame reference based on coordinate in the robot frame of reference for the converging point of the first, second and third coordinate line which is calculated by applying algorithm of square fitting respectively to the measured first, second and third coordinates for the measured locations.

3. The method according to claim 2, further comprising:
regulating orientations of the second and third coordination lines of the fixture frame of reference to be normal to that of the first coordination line of the fixture frame of reference in the robot frame of reference.

4. The method according to claim 1, wherein:
the first, second and third surface are arranged substantially perpendicular to each other.

5. A robot system, including:
a work object, having a first surface, a second surface and a third surface, wherein the work object frame of reference is defined by a first coordinate line, a second coordinate line, and a third coordinate line at intersections of the first surface, the second surface and the third surface converging on a point, and being configured for having a work piece mounted thereto in a predetermined manner;
a manipulator holding a touch probe; and
a robot controller having a motion control module, a calculation module and a memory module;
wherein:
   the motion control module is adapted for controlling the manipulator to touch a first number of locations on the first surface of the work object positioned by the robot touch probe to measure their actual locations on the first surface in the robot frame of reference, touch a second number of locations on the second surface of the work object positioned by the robot touch probe to measure their actual locations on the second surface in the robot frame of reference, and touch a third number of locations on the third surface of the work object positioned by the robot touch probe to measure their actual locations on the third surface in the robot frame of reference;
   the memory module is adapted for storing the measured first coordinates for the measured locations, storing the measured second coordinates for the measured locations, and storing the measured third coordinates for the measured locations; and
   the calculation module is adapted for calculating orientation and origin of the work object frame of reference from the robot frame of reference based on the measured first, second and third coordinates for the measured locations, where the work object is positioned in the robot cell;
wherein:
   the first number amounts equal to or above three;
   the second number amounts equal to or above three; and the third number amounts equal to or above three; and wherein the robot system is further adapted to determine coordinates in the robot frame of reference for multiple points on the work piece, based on off-line data specifying coordinates in the work object frame of reference for the multiple points on the work piece and in consideration of the calculated orientation and origin of the work object frame of reference; and wherein the robot system is further adapted to apply to the work piece coordinates a coordinate transformation indicative of the off-line data specifying the workpiece coordinates in the work object frame of reference.

6. The robot system according to claim 5, wherein:

the calculation of the first coordinate transformation includes:

determining orientation of the work object frame of reference relative to the robot frame of reference based on orientations of the first coordinate line, the second coordinate line and the third coordinate line which are calculated by applying algorithm of square fitting respectively to the measured first, second and third coordinates for the measured locations; and determining the origins between of the work object frame of reference and the robot frame of reference based on coordinate in the robot frame of reference for the converging point of the first, second and third coordinate line which is calculated by applying algorithm of square fitting respectively to the measured first, second and third coordinates for the measured locations.

7. The robot system according to claim 6, wherein:

orientations of the second and third coordination lines of the fixture frame of reference may be regulated to be normal to that of the first coordination line of the fixture frame of reference in the robot frame of reference.

8. The robot system according to claim 5, wherein:

the first, second and third surface are arranged substantially perpendicular to each other.

9. The method according to claim 2, wherein the first, second and third surface are arranged substantially perpendicular to each other.

10. The method according to claim 3, wherein:

the first, second and third surface are arranged substantially perpendicular to each other.

11. The robot system according to claim 6, wherein:

the first, second and third surface are arranged substantially perpendicular to each other.

12. The robot system according to claim 7, wherein:

the first, second and third surface are arranged substantially perpendicular to each other.

13. The method according to claim 1, wherein:

the first number amounts equal to four.

14. The robot system according to claim 5, wherein:

the first number amounts equal to four.

15. The method according to claim 1, wherein:

the work piece is defined by a shape without touchable features;

the work piece is mounted to the work object such that the work object and the work piece are transferred from location to location together without relative movement therebetween; and determining coordinates in the robot frame of reference for points on the work piece based on the calculated orientation and origin of the work object frame of reference.

16. The robot system according to claim 5, wherein:

the work piece is defined by a shape without touchable features;

the work piece is mounted to the work object such that the work object and the work piece are transferred from location to location together without relative movement therebetween; and determining coordinates in the robot frame of reference for points on the work piece based on the calculated orientation and origin of the work object frame of reference.

* * * * *